US008955458B2

(12) United States Patent
Salzmann et al.

(10) Patent No.: US 8,955,458 B2
(45) Date of Patent: Feb. 17, 2015

(54) WIRELESS DETECTION OF MOTION

(75) Inventors: Philip Emanuel Salzmann, Cardiff, CA (US); Javier Humberto Flores, San Diego, CA (US); Matthew Charles Wallace, Carlsbad, CA (US); Di Bian, San Diego, CA (US); Trang Nguyen, San Diego, CA (US); Ada Silos-Santiago, Del Mar, CA (US); Minh Vuong, San Diego, CA (US)

(73) Assignee: Vertex Pharmaceuticals, Inc., Boston, MA (US)

( * ) Notice: Subject to any disclaimer, the term of this patent is extended or adjusted under 35 U.S.C. 154(b) by 0 days.

(21) Appl. No.: 11/280,978

(22) Filed: Nov. 16, 2005

(65) Prior Publication Data

US 2007/0107666 A1 May 17, 2007

(51) Int. Cl.
*A01K 29/00* (2006.01)
*A01K 1/03* (2006.01)

(52) U.S. Cl.
CPC .............. *A01K 29/005* (2013.01); *A01K 1/031* (2013.01)
USPC .................... 119/421; 324/207.15; 340/572.1

(58) Field of Classification Search
CPC .......................... A01K 29/005; A01K 1/031
USPC .............. 119/421, 417, 718–721; 340/573.3, 340/540, 573.1, 500, 572.1, 10.1–10.6, 340/539.1–539.32; 324/207.15–207.19, 324/256–259
See application file for complete search history.

(56) References Cited

U.S. PATENT DOCUMENTS

| | | | | |
|---|---|---|---|---|
| 3,602,806 A * | 8/1971 | Czekajewski | ................. | 324/234 |
| 3,803,571 A * | 4/1974 | Luz | ................. | 119/421 |
| 3,823,990 A * | 7/1974 | Gilinson, Jr. | ................. | 310/90.5 |
| 4,634,975 A * | 1/1987 | Eccleston et al. | ............. | 324/232 |
| 4,918,432 A * | 4/1990 | Pauley et al. | ............... | 340/573.4 |
| 5,680,106 A | 10/1997 | Schrott et al. | | |
| 5,831,527 A * | 11/1998 | Jones et al. | .................. | 340/540 |
| 5,838,233 A * | 11/1998 | Hawes et al. | ............... | 340/572.5 |
| 5,951,362 A * | 9/1999 | Siu | ................. | 446/462 |
| 6,095,092 A * | 8/2000 | Chou | ................. | 119/721 |
| 6,404,340 B1* | 6/2002 | Paradiso et al. | ............. | 340/572.5 |
| 6,834,251 B1* | 12/2004 | Fletcher | ........................ | 702/150 |
| 6,969,987 B2* | 11/2005 | Schwartzbart | ................ | 324/174 |
| 6,972,677 B2* | 12/2005 | Coulthard | ...................... | 340/531 |
| 7,277,752 B2* | 10/2007 | Matos | ................. | 607/5 |
| 2001/0038332 A1* | 11/2001 | Rodgers et al. | ............ | 340/572.1 |
| 2002/0130775 A1* | 9/2002 | Engellenner | .................. | 340/540 |
| 2002/0135479 A1* | 9/2002 | Belcher et al. | ............. | 340/572.1 |
| 2003/0200814 A1* | 10/2003 | Oh et al. | ......................... | 73/779 |
| 2004/0001002 A1* | 1/2004 | Blum et al. | ................. | 340/573.1 |
| 2004/0203361 A1* | 10/2004 | Belcher et al. | ............... | 455/41.2 |
| 2007/0080805 A1* | 4/2007 | Franklin et al. | ............ | 340/572.1 |
| 2007/0107666 A1 | 5/2007 | Salzmann et al. | | |

FOREIGN PATENT DOCUMENTS

GB                556607        10/1943

* cited by examiner

*Primary Examiner* — Son T Nguyen
(74) *Attorney, Agent, or Firm* — Knobbe Martens Olson & Bear LLP

(57) ABSTRACT

Disclosed herein are systems and methods for detecting motion of an object, such as the paw of rat. A tag comprising an inductive element and a capacitive element may be attached to the object and the motion detected by monitoring the affect of the tag on a time-varying magnetic field.

10 Claims, 5 Drawing Sheets

WIRELESS DETECTION OF MOTION

BACKGROUND

1. Field of the Invention

The invention relates to detection of motion. In some aspects, the invention relates to detection of laboratory animal motion.

2. Description of the Related Art

In the discovery of neurological drugs, e.g., analgesics, many animal pain models are used. In one such model, a small amount of formalin is injected into one rear paw of a rat. The resulting irritation causes the rat to lick and/or to shake this paw in a repetitive, flinch-like motion. This reaction is considered a painful response. A test compound is administered to the rat after the formalin injection and changes in paw motion counts are used to assess the compound's analgesic effect. In other tests, a rat paw is exposed to a heat source and the motion of the paw is monitored as the rats are exposed to various neurological compounds. Such tests can be used to screen analgesic compounds or to perform other neurological experiments.

Currently, the most commonly used instrumentation for detecting rat paw motion employs a metal detector to sense the motion of a metallic bracelet attached to a paw. With reference to FIG. 1, a metal detector typically consists of two induction coils. A transmitter coil 100 is energized with a relatively low-frequency (5-10 KHz) AC signal. A receiver coil 110 is concentric and coplanar with the transmitter coil 100. The coils are only weakly coupled through free space. When a small piece of metal (e.g., a rat paw bracelet 120) is introduced into the area above the two coils, the coupling is increased and a stronger signal is detected by the receiver coils 110. The metallic bracelet 120 concentrates the magnetic flux so that more field lines are captured by the receiver coil 110, giving rise to a stronger detected signal. As this design relies on the phenomenon of flux concentration, bracelets made from high magnetic permeability metals give rise to the largest signals. Overall, this effect is weak and a very high level of amplification is needed to detect it.

In a typical laboratory environment, this design suffers from several disadvantages. First, there is usually a significant amount of metal in a typical lab, often causing mistriggering of the device. For example, wristwatches worn by the operators are a common source of interference. Second, the receiver coil's 110 cross-section is large and a very high level of amplification is used causing stray magnetic fields from various power sources to elicit false signals. Third, multiple detectors cannot be placed too close to each other because stray magnetic induction from one unit tends to falsely trigger its nearest neighbors. Thus, there is a need for improved motion detectors, particularly for use in detecting rodent paw motion.

SUMMARY OF CERTAIN EMBODIMENTS

One aspect of the invention is a system for detecting motion of a tag, including a coil configured for generating a time-varying magnetic field, a tag comprising an inductive element and a capacitive element positioned with respect to the coil such that tag motion moves the tag relative to the coil.

Another aspect of the invention is a system for detecting motion of a tag, including a means for generating a time-varying magnetic field, a means for sensing a change in the time-varying magnetic field, and a tag, the tag comprising an LC circuit for causing a change in the time-varying magnetic field when the tag is in motion within the time-varying magnetic field.

Another aspect of the invention is a system for detecting motion of a tag, including a sensing coil comprising a wire wound into a coil, the coil defining a perimeter, an AC generator electrically coupled to the wire, a circuit electrically coupled to the wire, the circuit adapted to detect a change in AC current flowing through the wire, and a tag, the tag comprising an inductive element and a capacitive element, wherein the tag is within the perimeter of the coil but not necessarily coplanar with the coil, and wherein when the tag is in motion, the motion causes a change in any AC current flowing through the wire.

Another aspect of the invention is a tag for monitoring motion of a paw on a rodent, including an inductor and capacitor electrically coupled in parallel and a paw mount coupled to the inductor and capacitor.

Another aspect of the invention is a method of detecting motion of an object, including exposing a tag comprising an inductive element and a capacitive element to a time-varying magnetic field, and detecting a change in the time-varying magnetic field caused by motion of the tag within the magnetic field.

Another aspect of the invention is a method of assaying for an anti-nociceptive drug, including attaching a tag to a paw of the rodent, the tag comprising an inductive element and a capacitive element, administering a potential anti-nociceptive drug to a rodent, exposing the paw to a nociceptive stimulus, exposing the tag to a time-varying magnetic field, and monitoring motion of the paw by detecting a change in the time-varying magnetic field induced by motion of the tag within the field.

DETAILED DESCRIPTION OF CERTAIN EMBODIMENTS

In some embodiments, systems and methods are provided for detecting motion of a tag. The tag may be attached to anything. In one advantageous embodiment, the tag is attached to a paw of a rodent such as a rat. The tag may be attached to the paw using any suitable structure. In one embodiment, a bracelet structure is used to attach the tag to a rodent's paw. In some advantageous embodiments, the tag does not need to have a power source and may be used as a wireless device. In one embodiment, the tag comprises an inductive element and a capacitive element. Any electrical structures may be used for the inductive and capacitive elements provided the electrical structures exhibit corresponding inductive and capacitive behavior. In one embodiment, the inductive element is an inductor and the capacitive element is a capacitor. In one embodiment, the inductor and capacitor are connected in parallel.

A tag including an inductor-capacitor element connected in parallel will couple with a time-varying magnetic field. Thus, when an inductor-capacitor element is exposed to a time-varying magnetic field, the magnetic field may be altered by the presence of the tag. Furthermore, motion of the tag within the field may elicit a time-varying alteration of the field. Detection of this time-varying alteration can provide an indication of the motion of the tag. Accordingly, in one embodiment, a system for detecting the motion of a tag is provided that includes a time-varying magnetic field generator, a magnetic field sensor, and a tag including an inductive element and a capacitive element. The sensor may be used to detect a change in the time-varying magnetic field induced by motion of the tag within the field. In some embodiments, the magnetic field generator and magnetic field sensor may include wire coils. In one embodiment, a single coil may serve as both the magnetic field generator and sensor.

Figure 1:
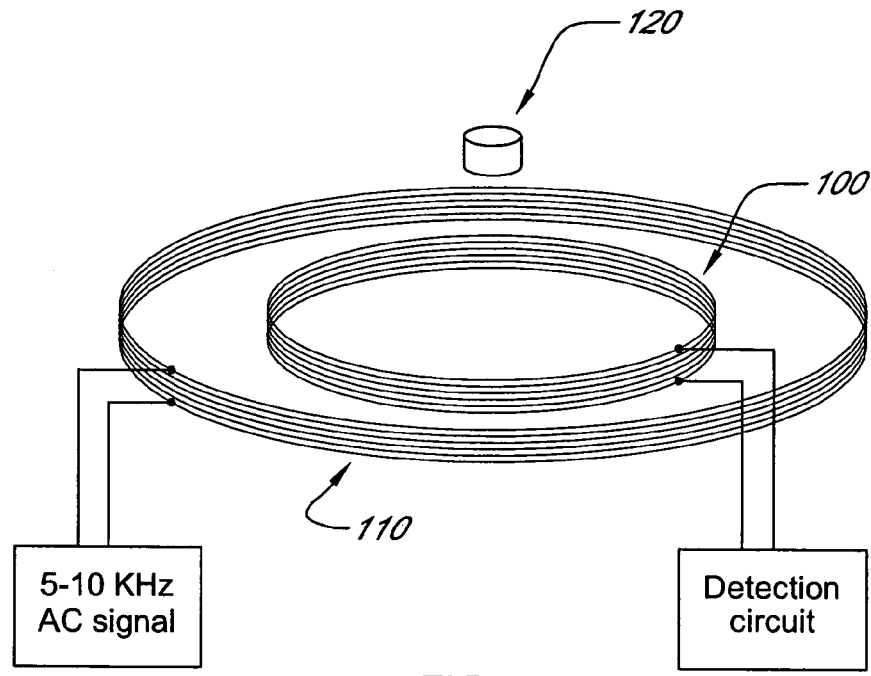
FIG. 1 depicts a prior art metal detecting apparatus used for detecting motion.
Figure 2:
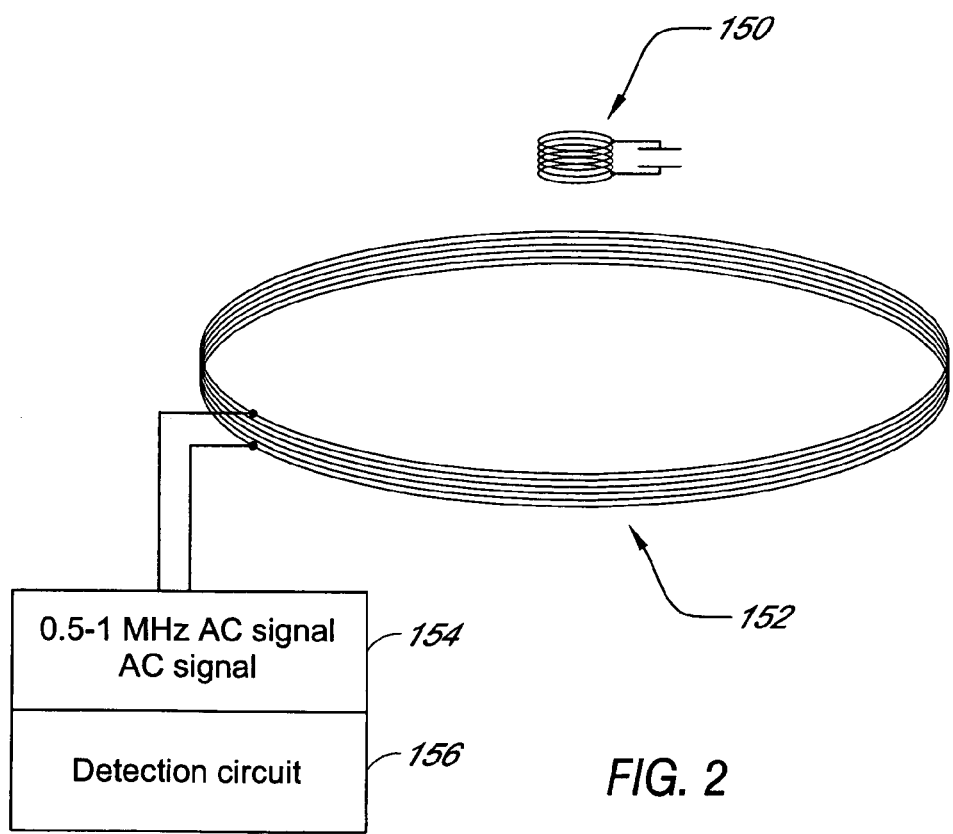
FIG. 2 depicts a motion detecting apparatus including a sensing coil and an inductor-capacitor element tag.

FIG. 2 depicts one system for detecting motion of a tag. The system includes a tag 150 comprising an inductor and capacitor connected in parallel. The system also includes a sensing coil 152 connected to an AC signal generator 154 and a detection circuit 156. The AC signal generator 154 sets up an alternating current through the coil 152, which induces a time-varying magnetic field. In one embodiment, the sensing coil 152 is driven by an AC signal whose frequency (e.g., 0.5-1 MHz) is chosen to be close to or equal to the resonant frequency of the inductor-capacitor element in the tag 150. Because the drive frequency is chosen to be approximately equal to this resonant frequency, the inductor-capacitor element is very efficient at removing energy from the sensing field. Thus, when the tag 150 is introduced into the sensing coil's 152 time-varying magnetic field, the inductor-capacitor circuit absorbs some of the field's energy. This energy loss can then be sensed with the proper detection circuit 156 connected to the sensing coil 152. The time variation of the energy loss can be used to indicate motion of the tag 150 within the time-varying magnetic field induced by coil 152.

Figure 3:
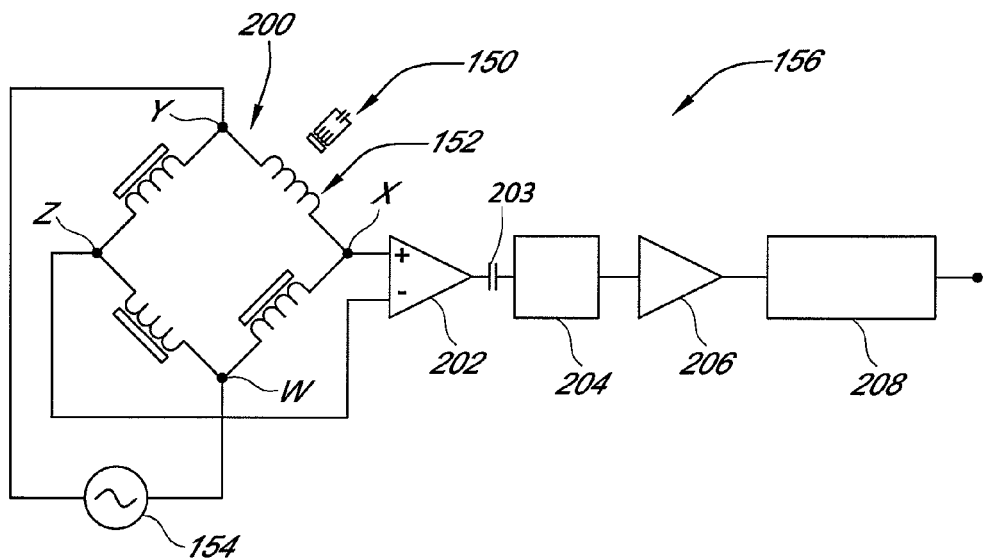
FIG. 3 depicts a detection circuit for detecting change in a time-varying magnetic field.

FIG. 3 depicts one embodiment of a detection circuit 156. The sensing coil 152 forms one leg of a four-coil bridge 200, which is driven by a high-frequency AC signal from signal generator 154. The sensing coil 152 is connected to the bridge 200 at nodes X and Y. The generator 154 is connected to nodes Y and W of the bridge 200. When the inductor-capacitor element in the tag 150 is in the time-varying magnetic field induced by the sensing coil 152, the bridge 200 becomes increasingly unbalanced, causing an increase in the output of a differential amplifier 202 connected to the nodes X and Z of the bridge 200. This output is AC-coupled by an output capacitor 203 and rectified by a rectifier 204 and amplified by a high gain amplifier 206. The AC-coupled signal may then be passed through a low frequency bandpass filter 208 so that only low frequency variation in the signal (e.g., caused by motion of the tag 150 in the magnetic field) is detected. Those of skill in the art will recognize that many other circuit designs than that described above may be used to detect magnetic field variation using a sensing coil.

Figure 4:
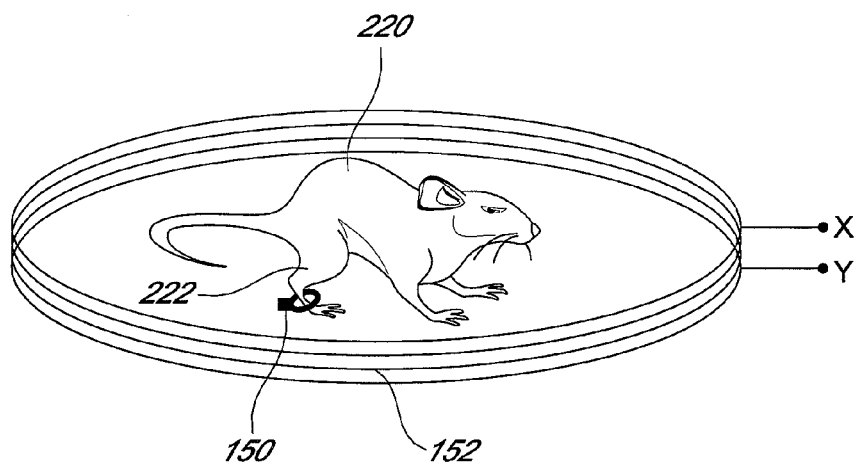
FIG. 4 illustrates a rodent wearing a tag and placed within a sensing coil.

FIG. 4 depicts the sensing coil 152 with a rodent 220 placed within the coil 152. The two terminals of coil 152 are connected to nodes X and Y of the four-coil bridge 200. The tag 150 comprising the inductor-capacitor element may be placed on a leg 222 of the rodent 220. When the rodent's leg 222 moves up and down, the tag 150 will also move up and down, inducing a change in the current flowing through coil 152.

Figure 5:
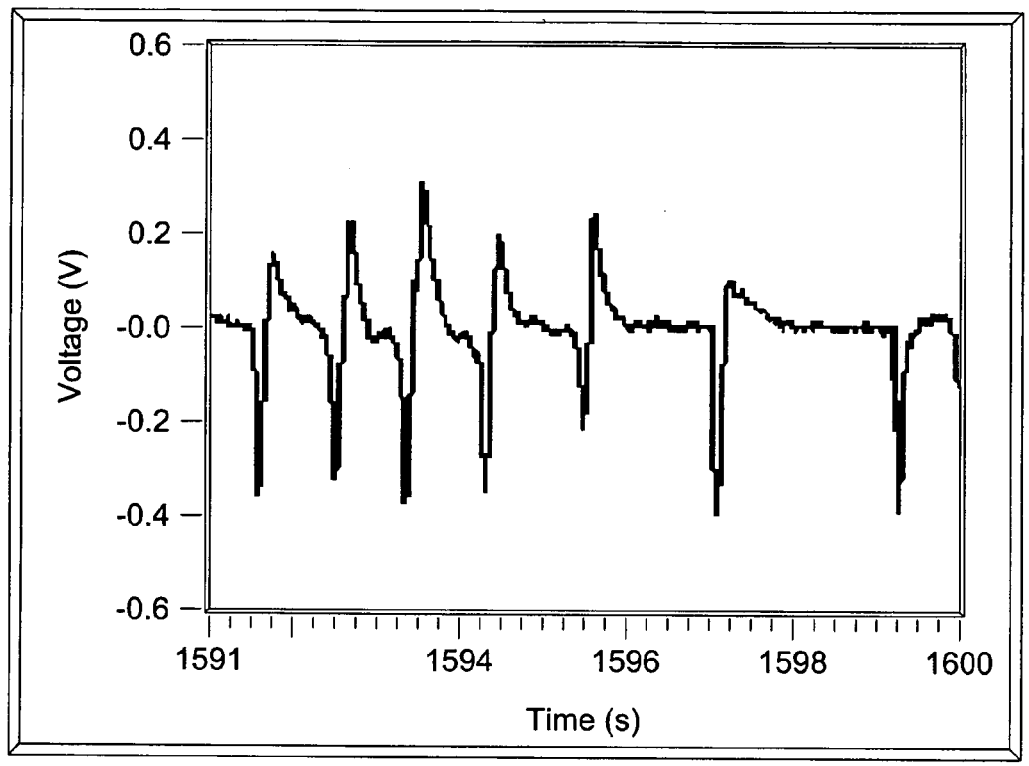
FIG. 5 depicts a graph of the biphasic motion signal observed from rat paw flinching.

In some embodiments, because the signal produced by the apparatus described above is AC-coupled, the low frequency variation in signal produced by motion of an inductor-capacitor tag is indicative of rate of motion of the tag rather than absolute position of the tag. Thus, positive amplitudes indicate rate of motion in the upward direction and negative amplitudes indicate rate of motion in the downward direction. FIG. 5 depicts a graph of signal amplitude generated by motion of a rat paw flinching. Each flinch results in a biphasic signal. The positive lobe is systematically smaller in amplitude than the negative lobe, indicating that the rat puts down its foot slowly but lifts it quickly.

Figure 6:
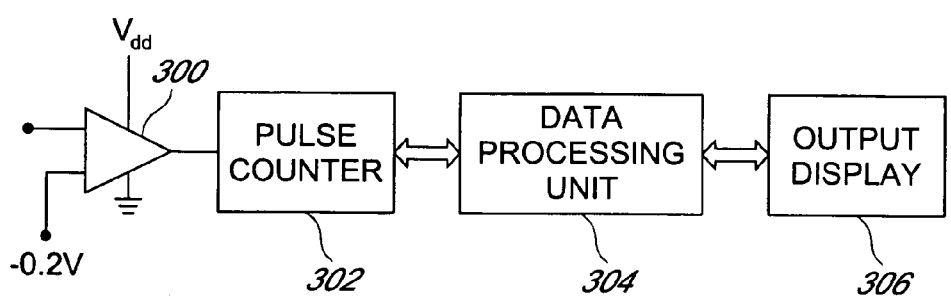
FIG. 6 depicts an automatic pulse counting circuit.

In some embodiments, a motion detecting apparatus may be automated. For example, the motion signal may be analyzed by a computer to determine the number of up-down movements as a function of time. Thus, a system may be provided that provides an automated output of frequency of rat paw flinching. For example, the system may count each biphasic signal as one flinch. FIG. 6 depicts one embodiment of an automated motion counter. The output from the detection circuit 156, such as the circuit depicted in FIG. 3, is input into op-amp 300, which outputs a pulse for each biphasic signal from the detection circuit 156. The output from op-amp 300 is input into pulse counter 302, whose output may be analyzed by data processing circuit 304. If desired, the resulting pulse count and/or frequency may be determined by data processing circuit 304 and displayed on output display 306.

In some embodiments, the motion detecting apparatus and methods disclosed herein have several advantages when compared with other motion detecting systems. First, an inductor-capacitor element is very efficient at coupling to a resonant magnetic field, thus generating a large signal. Other structures in a typical laboratory environment are unlikely to be as efficient in coupling to the generated magnetic field. Thus, the chance of detecting extraneous signals is reduced. Second, given the resonant nature of an inductor-capacitor circuit, high levels of amplification are not needed because the signal is fairly large. Thus, the system's sensitivity to interference from stray magnetic fields in the environment is reduced. Third, inductor-capacitor elements can easily be miniaturized using surface-mount components. For example, tags may be made to weigh very little (e.g., 0.3 grams). Thus, a rodent wearing the tag will not perceive significant inertia caused by the tag, which could interfere with its paw flinching. Fourth, several sensing coils can function very close to each other without causing cross-interference. It was observed that two coils operating at the same frequency did not interfere with each other even when placed only a few inches apart. While not being bound by any particular theory, it is believed that coil-coil crosstalk is reduced because the amplification level in each coil is not very high. It is believed that coil-tag crosstalk is reduced because the tags only capture a very small area of the field of a sensing coil when not inside the circle of the coil. Accordingly, a large number of units may be deployed close to each other. Such high-density deployment allows high-throughput usage such as for testing multiple rodent paw flinching simultaneously.

In one embodiment, a method for assaying for an anti-nociceptive drug is provided. A tag such as described above may be attached to a paw of a rodent. A potential anti-nociceptive drug may then be administered to the rodent. A nociceptive stimulus, such as a formalin injection or a heat source, may be applied to the paw of the rodent and the resulting motion of the paw monitored by the above-described system.

Although one advantageous application of the systems and methods described herein is for detecting flinching of a rat paw. It should be recognized that the systems and methods may be used to detect motion of any object placed within a sensing coil.

EXAMPLES

Example 1

Figure 7:
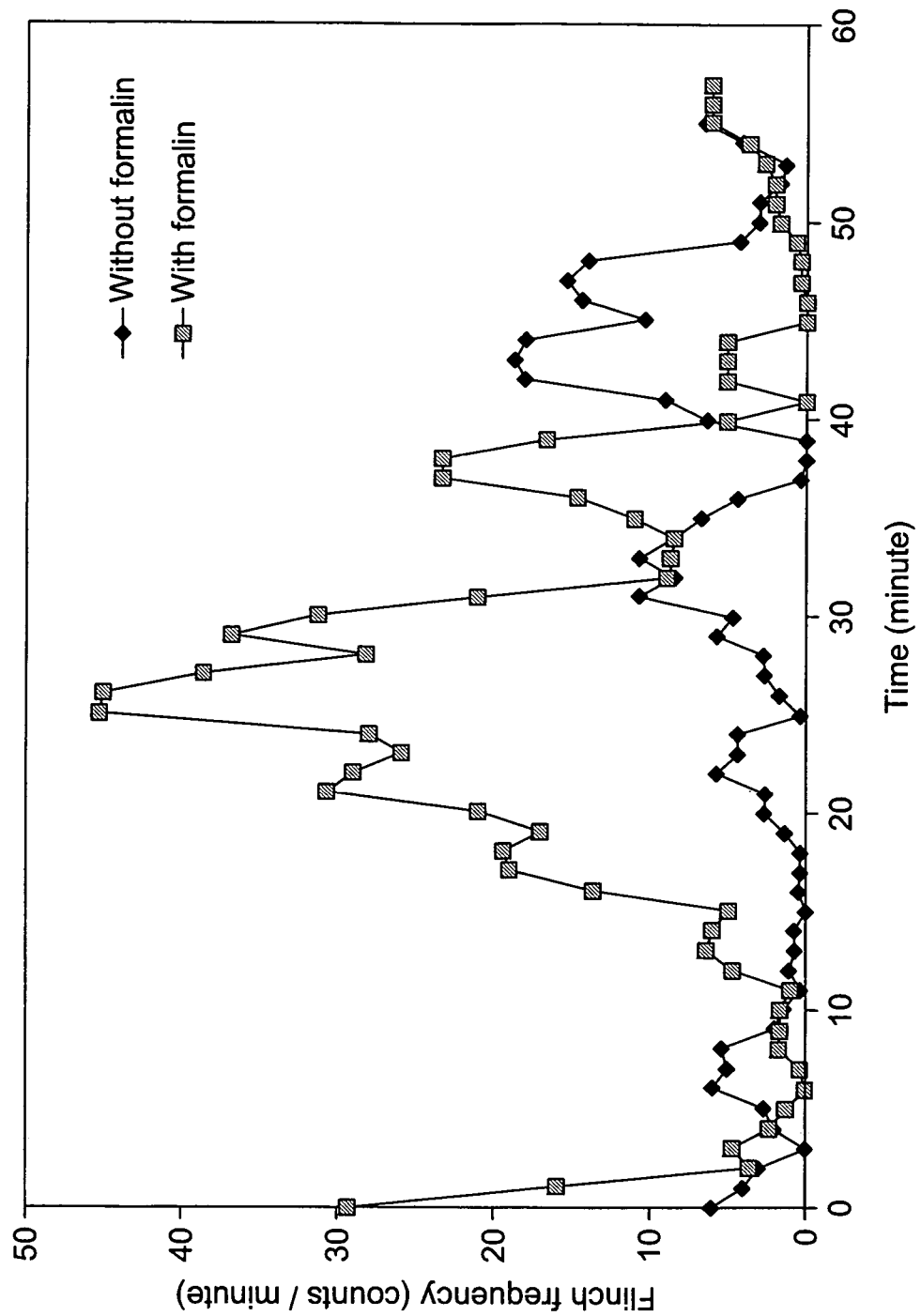
FIG. 7 depicts a graph of the frequency of rat paw flinching with and without formalin.

A rat was fitted with an inductor-capacitor tag on its left rear paw and placed within a detector as described in FIGS. 2 and 3. A baseline of paw motion was detected. Formalin was then injected into the paw and the resulting signal was detected. FIG. 7 depicts a graph with each data point representing flinch frequency as function of time. The diamonds indicate the base line measurement and the squares represent the result after injection with formalin. The formalin results exhibit a stereotypical two-phase regime. There was high frequency flinching in the first 5-10 minutes. After a brief quiescence at about 10 minutes, prolonged and intensive flinching was detected for the next 30 minutes or so.

Example 2

Figure 8:
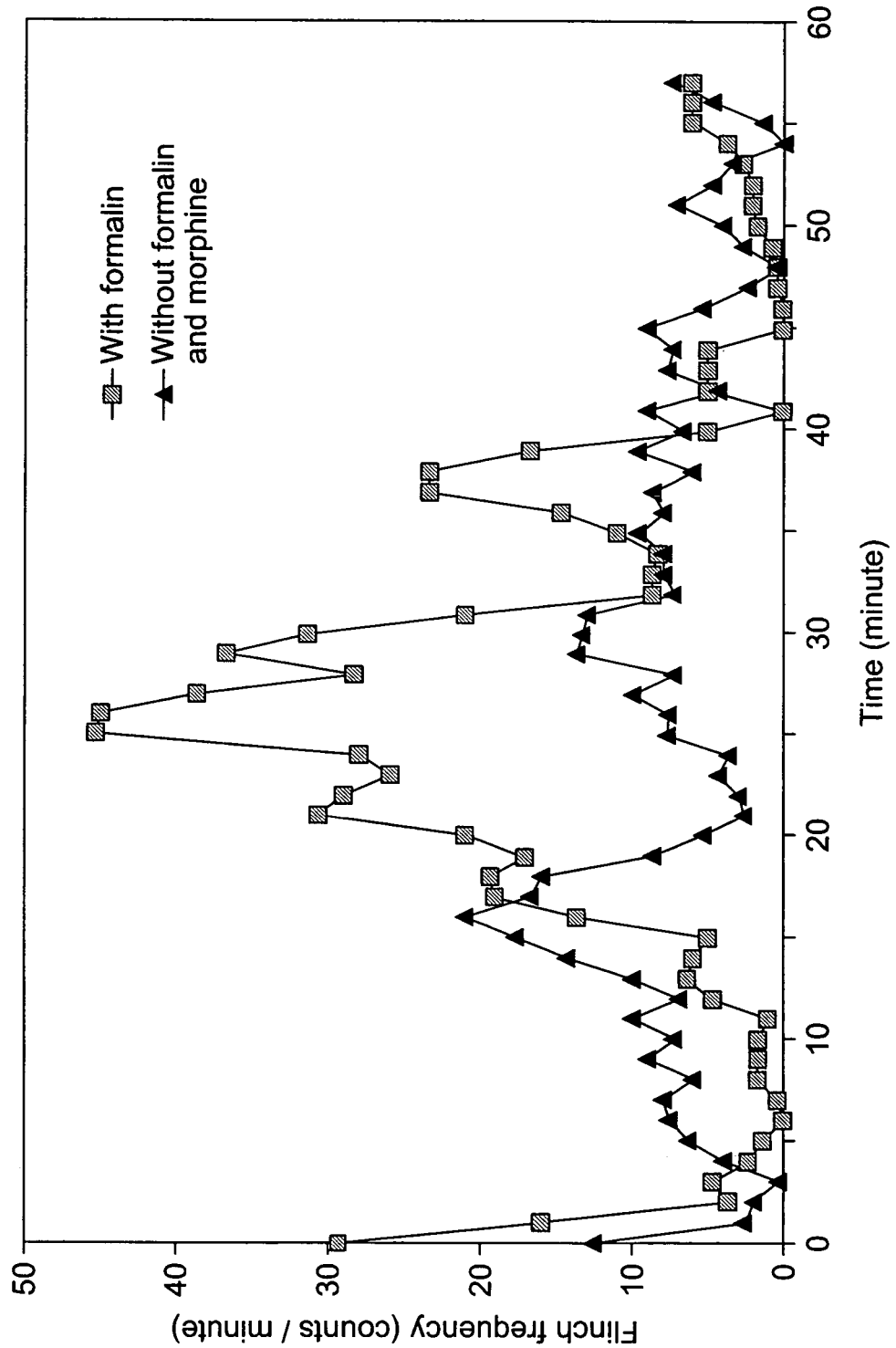
FIG. 8 depicts a graph of the frequency of rat paw flinching in the presence of formalin with and without morphine.

A second rat received the same formalin treatment as the rat in Example 1; however, an injection of morphine (3 mg/kg, sub-cutaneous) was also administered. FIG. 8 depicts the flinching frequency of this second rat (triangles) compared with the first rat (squares). The second rat's flinching pattern also displayed two phases but was much reduced in terms of frequency when compared with the control (square data points), which did not receive any morphine.

What is claimed is:

1. A system for detecting flinching motion of a foot of an animal, comprising:
    a single sensing coil comprising a wire wound into a coil, said coil defining a perimeter that surrounds the whole of an animal;
    an AC generator electrically coupled to said wire;
    a circuit electrically coupled to said wire, said circuit adapted to detect AC current flowing through said wire;
    a tag attached to a foot of said animal, said tag comprising an inductive element and a capacitive element, wherein said tag is within the perimeter of said coil but not necessarily coplanar with said coil, and wherein said circuit electrically coupled to said wire, said circuit comprises an output capacitor providing an AC-coupled output indicative of rate of motion of said tag rather than absolute position of said tag, said circuit produces biphasic output pulses corresponding to flinching motions of said foot, wherein the rate of tag motion is indicated by an amplitude of each phase of the biphasic output pulse and an upward or downward direction of tag motion is indicated by a positive or negative polarity of each phase of said biphasic output pulse; and,
    a pulse counter counts said output pulses from said circuit so as to count the number of flinching motions of said foot over a time period.

2. The system of claim 1, wherein said tag comprises an inductor and a capacitor electrically coupled in parallel.

3. The system of claim 2, wherein said AC generator is adapted to drive said sensing coil with an AC current having a frequency, and wherein said electrically coupled inductor and capacitor have a resonant frequency approximately equal to said AC frequency.

4. The system of claim 1, wherein said circuit comprises a four-coil inductive bridge, wherein said sensing coil comprises one leg of said bridge.

5. The system of claim 4, wherein said AC generator is electrically coupled to two nodes of said bridge.

6. The system of claim 5, wherein said circuit comprises a differential amplifier electrically coupled to two other nodes of said bridge.

7. The system of claim 4, wherein said circuit comprises a differential amplifier electrically coupled to said bridge.

8. The system of claim 7, wherein said circuit comprises a rectifier electrically coupled to said differential amplifier.

9. The system of claim 8, wherein the rectifier is directly coupled to said differential amplifier.

10. The system of claim 8, wherein said circuit comprises a high gain amplifier electrically coupled to said rectifier and a low frequency band pass filter electrically coupled to said high gain amplifier.

* * * * *